US009166883B2

(12) United States Patent
Marchese

(10) Patent No.: US 9,166,883 B2
(45) Date of Patent: Oct. 20, 2015

(54) NETWORK DEVICE DETECTION, IDENTIFICATION, AND MANAGEMENT

(76) Inventor: Joseph Robert Marchese, Ray, MI (US)

(*) Notice: Subject to any disclaimer, the term of this patent is extended or adjusted under 35 U.S.C. 154(b) by 572 days.

(21) Appl. No.: 11/697,045

(22) Filed: Apr. 5, 2007

(65) Prior Publication Data
US 2007/0237141 A1 Oct. 11, 2007

Related U.S. Application Data

(60) Provisional application No. 60/744,307, filed on Apr. 5, 2006.

(51) Int. Cl.
H04L 12/24 (2006.01)
H04L 12/26 (2006.01)

(52) U.S. Cl.
CPC ............ H04L 41/12 (2013.01); H04L 41/0853 (2013.01); H04L 41/0253 (2013.01)

(58) Field of Classification Search
USPC ........................................ 370/389
See application file for complete search history.

(56) References Cited

U.S. PATENT DOCUMENTS

| 4,513,318 A | 4/1985 | Wilensky et al. |
| 4,575,124 A | 3/1986 | Morrison |
| 4,628,342 A | 12/1986 | Desmons et al. |
| 4,814,869 A | 3/1989 | Oliver, Jr. |
| 4,991,193 A | 2/1991 | Cecil et al. |
| 5,155,585 A | 10/1992 | Ishikawa |
| 5,311,306 A | 5/1994 | Tanaka et al. |
| 5,313,280 A | 5/1994 | Straus |
| 5,355,453 A | 10/1994 | Row et al. |
| 5,512,974 A | 4/1996 | Abe et al. |
| 5,561,476 A | 10/1996 | Kershaw et al. |
| 5,625,410 A | 4/1997 | Washino et al. |
| 5,627,886 A | 5/1997 | Bowman |
| 5,649,185 A | 7/1997 | Antognini et al. |
| 5,663,951 A | 9/1997 | Danneels et al. |
| 5,666,152 A | 9/1997 | Stoker |

(Continued)

FOREIGN PATENT DOCUMENTS

| EP | 0871326 A2 | 10/1998 |
| EP | 0967584 A2 | 12/1999 |

(Continued)

OTHER PUBLICATIONS

Beausoft Main Page Achive (Feb. 29, 2000) Availible at http://web.archive.org/web/20000229205711/http:// beausoft.com/ Downloaded Sep. 2, 2003, 2 pages.

(Continued)

Primary Examiner — Ayaz Sheikh
Assistant Examiner — Tarell Hampton
(74) Attorney, Agent, or Firm — Brooks & Kushman P.C.

(57) ABSTRACT

A method for identifying devices on a network using a two-step process of first scanning a range network addresses for devices and then acquiring device information from each of the accessible devices. The method involves scanning the network for devices by sending a request to each of a plurality of network addresses, receiving a response from one or more of the devices, obtaining a hardware address for at least some of the responding devices, and identifying the device based on the hardware address. A user interface is provided to display the results of the scan along with the more specific identifying information for some or all of the responding devices.

42 Claims, 12 Drawing Sheets

(56) References Cited

U.S. PATENT DOCUMENTS

| Patent Number | Date | Inventor | Reference |
|---|---|---|---|
| 5,724,475 A | 3/1998 | Kirsten | |
| 5,745,161 A | 4/1998 | Ito | |
| 5,754,111 A | 5/1998 | Garcia | |
| 5,761,655 A | 6/1998 | Hoffman | |
| 5,786,872 A | 7/1998 | Miyazaki et al. | |
| 5,790,548 A | 8/1998 | Sistanizadeh et al. | |
| 5,790,664 A | 8/1998 | Coley et al. | |
| 5,802,366 A | 9/1998 | Row et al. | |
| 5,805,801 A | 9/1998 | Holloway et al. | |
| 5,861,924 A | 1/1999 | Pan et al. | |
| 5,903,762 A | 5/1999 | Sakamoto et al. | |
| 5,941,954 A | 8/1999 | Kalajan | |
| 5,976,083 A | 11/1999 | Richardson et al. | |
| 6,002,428 A | 12/1999 | Matsumura et al. | |
| 6,002,995 A | 12/1999 | Suzuki et al. | |
| 6,014,183 A | 1/2000 | Hoang | |
| 6,058,420 A | 5/2000 | Davies | |
| 6,069,655 A | 5/2000 | Seeley et al. | |
| 6,081,845 A | 6/2000 | Kanemaki et al. | |
| 6,091,771 A | 7/2000 | Seeley et al. | |
| 6,092,078 A | 7/2000 | Adolfsson | |
| 6,097,429 A | 8/2000 | Seeley et al. | |
| 6,101,182 A | 8/2000 | Sistanizadeh et al. | |
| 6,115,035 A | 9/2000 | Compton et al. | |
| 6,125,108 A | 9/2000 | Shaffer et al. | |
| 6,135,951 A | 10/2000 | Richardson et al. | |
| 6,167,446 A * | 12/2000 | Lister et al. | 709/223 |
| 6,175,622 B1 | 1/2001 | Chiniwala et al. | |
| 6,178,419 B1 | 1/2001 | Legh-Smith et al. | |
| 6,204,843 B1 | 3/2001 | Freeman et al. | |
| 6,226,031 B1 | 5/2001 | Barraclough et al. | |
| 6,233,428 B1 | 5/2001 | Fryer | |
| 6,236,395 B1 | 5/2001 | Sezan et al. | |
| 6,241,609 B1 | 6/2001 | Rutgers | |
| 6,269,309 B1 | 7/2001 | Buckingham | |
| 6,271,752 B1 | 8/2001 | Vaios | |
| 6,323,897 B1 | 11/2001 | Kogane et al. | |
| 6,357,042 B2 | 3/2002 | Srinivasan et al. | |
| 6,396,533 B1 | 5/2002 | Hudson | |
| 6,405,318 B1 | 6/2002 | Rowland | |
| 6,449,426 B1 | 9/2002 | Suga et al. | |
| 6,452,925 B1 | 9/2002 | Sistanizadeh et al. | |
| 6,476,858 B1 | 11/2002 | Diaz et al. | |
| 6,484,219 B1 * | 11/2002 | Dunn et al. | 710/42 |
| 6,516,340 B2 | 2/2003 | Boys | |
| 6,539,124 B2 | 3/2003 | Sethuraman et al. | |
| 6,564,380 B1 | 5/2003 | Murphy | |
| 6,574,612 B1 | 6/2003 | Baratti et al. | |
| 6,583,813 B1 | 6/2003 | Enright et al. | |
| 6,591,022 B2 | 7/2003 | Dewald | |
| 6,591,279 B1 | 7/2003 | Emens et al. | |
| 6,608,650 B1 | 8/2003 | Torres et al. | |
| 6,618,074 B1 | 9/2003 | Seeley et al. | |
| 6,748,318 B1 | 6/2004 | Jones | |
| 6,760,324 B1 | 7/2004 | Scott et al. | |
| 6,763,023 B1 * | 7/2004 | Gleeson et al. | 370/392 |
| 6,803,945 B1 | 10/2004 | Needham | |
| 6,804,606 B2 | 10/2004 | Jones | |
| 6,813,394 B1 | 11/2004 | Matsumoto et al. | |
| 6,856,967 B1 | 2/2005 | Woolston et al. | |
| 6,891,566 B2 | 5/2005 | Marchese | |
| 6,895,511 B1 | 5/2005 | Borsato et al. | |
| 6,904,359 B2 | 6/2005 | Jones | |
| 6,928,656 B1 | 8/2005 | Addington | |
| 6,954,859 B1 | 10/2005 | Simerly et al. | |
| 6,978,303 B1 | 12/2005 | McCreesh et al. | |
| 6,985,178 B1 | 1/2006 | Morita et al. | |
| 7,015,806 B2 | 3/2006 | Naidoo et al. | |
| 7,035,914 B1 | 4/2006 | Payne et al. | |
| 7,047,298 B2 | 5/2006 | Davies | |
| 7,136,838 B1 | 11/2006 | Peinado et al. | |
| 7,185,240 B2 | 2/2007 | Saito et al. | |
| 7,289,995 B2 * | 10/2007 | Motoyama et al. | 707/10 |
| 7,392,310 B2 * | 6/2008 | Motoyama et al. | 709/224 |
| 7,451,312 B2 | 11/2008 | Medvinsky et al. | |
| 7,478,152 B2 * | 1/2009 | Holt et al. | 709/223 |
| 7,500,003 B2 * | 3/2009 | Motoyama et al. | 709/227 |
| 7,523,481 B2 | 4/2009 | Creamer et al. | |
| 7,533,805 B1 | 5/2009 | Enright et al. | |
| 7,533,806 B1 | 5/2009 | Enright | |
| 7,545,816 B1 | 6/2009 | Coutts et al. | |
| 7,551,612 B2 | 6/2009 | Kobayashi et al. | |
| 7,577,273 B2 | 8/2009 | Rhoads et al. | |
| 7,595,816 B1 | 9/2009 | Enright et al. | |
| 7,596,749 B2 * | 9/2009 | Motoyama et al. | 715/237 |
| 7,610,380 B2 * | 10/2009 | Igarashi et al. | 709/226 |
| 7,630,986 B1 | 12/2009 | Herz et al. | |
| 7,949,722 B1 | 5/2011 | Ullman et al. | |
| 7,950,573 B1 | 5/2011 | Enright et al. | |
| 7,952,609 B2 | 5/2011 | Simerly et al. | |
| 7,966,632 B1 | 6/2011 | Pan et al. | |
| 8,578,439 B1 | 11/2013 | Mathias et al. | |
| 2001/0008014 A1 | 7/2001 | Farrell et al. | |
| 2001/0010523 A1 | 8/2001 | Sezan et al. | |
| 2001/0011253 A1 | 8/2001 | Coley et al. | |
| 2001/0012286 A1 | 8/2001 | Huna et al. | |
| 2001/0013123 A1 | 8/2001 | Freeman et al. | |
| 2001/0020299 A1 | 9/2001 | Barraclough et al. | |
| 2001/0023436 A1 | 9/2001 | Srinivasan et al. | |
| 2001/0033335 A1 | 10/2001 | Kubota et al. | |
| 2001/0049275 A1 | 12/2001 | Pierry et al. | |
| 2002/0003575 A1 | 1/2002 | Marchese | |
| 2002/0059407 A1 | 5/2002 | Davies | |
| 2002/0109863 A1 | 8/2002 | Monroe | |
| 2002/0147982 A1 | 10/2002 | Naidoo et al. | |
| 2003/0050718 A1 * | 3/2003 | Tracy et al. | 700/91 |
| 2003/0065754 A1 * | 4/2003 | Jones et al. | 709/221 |
| 2003/0085998 A1 | 5/2003 | Ramirez-Diaz et al. | |
| 2003/0184784 A1 * | 10/2003 | Ferlitsch | 358/1.13 |
| 2003/0195697 A1 | 10/2003 | Jones | |
| 2003/0195698 A1 | 10/2003 | Jones | |
| 2003/0197785 A1 | 10/2003 | White et al. | |
| 2003/0202420 A1 * | 10/2003 | Chobotaro et al. | 365/200 |
| 2003/0233188 A1 | 12/2003 | Jones | |
| 2003/0233190 A1 | 12/2003 | Jones | |
| 2004/0001214 A1 | 1/2004 | Monroe | |
| 2004/0030926 A1 | 2/2004 | Clark | |
| 2004/0078825 A1 | 4/2004 | Murphy | |
| 2004/0128315 A1 * | 7/2004 | Motoyama et al. | 707/104.1 |
| 2004/0128365 A1 * | 7/2004 | Motoyama et al. | 709/219 |
| 2004/0209617 A1 * | 10/2004 | Hrastar | 455/434 |
| 2004/0214559 A1 * | 10/2004 | Date et al. | 455/418 |
| 2004/0240453 A1 * | 12/2004 | Ikeda et al. | 370/395.21 |
| 2005/0031226 A1 | 2/2005 | Sugimoto et al. | 382/286 |
| 2005/0165927 A1 * | 7/2005 | Motoyama et al. | 709/224 |
| 2005/0200714 A1 | 9/2005 | Marchese | |
| 2005/0201273 A1 * | 9/2005 | Shimizu | 370/216 |
| 2005/0231596 A1 | 10/2005 | Marchese | |
| 2005/0268141 A1 | 12/2005 | Alben et al. | |
| 2006/0053459 A1 | 3/2006 | Simerly et al. | |
| 2006/0059255 A1 * | 3/2006 | Motoyama et al. | 709/224 |
| 2006/0067304 A1 | 3/2006 | McDowall et al. | |
| 2006/0106729 A1 | 5/2006 | Roberts | |
| 2006/0159032 A1 * | 7/2006 | Ukrainetz et al. | 370/254 |
| 2006/0279774 A1 * | 12/2006 | Matsuoka et al. | 358/1.15 |
| 2007/0011450 A1 * | 1/2007 | McCreight et al. | 713/165 |
| 2007/0124455 A1 * | 5/2007 | Motoyama et al. | 709/224 |
| 2007/0237141 A1 | 10/2007 | Marchese | |
| 2007/0279774 A1 | 12/2007 | Huang | |
| 2008/0189405 A1 * | 8/2008 | Zarenin et al. | 709/224 |
| 2009/0019141 A1 * | 1/2009 | Bush et al. | 709/223 |
| 2009/0216564 A1 | 8/2009 | Rosenfeld | |
| 2010/0212024 A1 | 8/2010 | Marchese | |
| 2011/0010307 A1 | 1/2011 | Bates et al. | |

FOREIGN PATENT DOCUMENTS

| | | |
|---|---|---|
| GB | 2329541 A | 3/1999 |
| JP | 2004178565 A1 | 6/2004 |
| WO | 9834360 A1 | 8/1998 |

(56) References Cited

FOREIGN PATENT DOCUMENTS

| | | | |
|---|---|---|---|
| WO | 9847117 | A1 | 10/1998 |
| WO | 0169405 | A1 | 9/2001 |

OTHER PUBLICATIONS

Beausoft Webcam Watcher Descripiton Page (Feb. 29, 2000) Availible at http://web.archive.org/ web/20000620224026/www.webcam-watcher.com/wcwindex.html Downloaded Sep. 2, 2003, 4 pages.

Tar(1) Man Page For Solaris 2.4 Availible at htpp://docs.sun.com/db/doc/801-6680-01/6illqc0ml?a=view Downloaded Sep. 2, 2003, 8 pages.

Appendix D-1 Invalidity Claim Chart over Nomura and Secondary References U.S. Pat. No. 6,891,566, Jul. 18, 2013, 23 pages.

Appendix A-1 Invalidity Claim Chart over Milestone's Prior Art Software, U.S. Pat. No. 8,185,964, AM22149760, Jul. 18, 2013, 2 pages.

A Brief History of the Cygwin Project Availible at http://cygwin.com/history.html Downloaded Jun. 14, 2004, 18 pages.

JPEG Standard ISO/IEC IS 10918-1/ITU-T Recommendation T .81 Sep. 1992, 186 pgs.

Bisdikian et al. "On the effectiveness of priorities in token ring for multimedia traffic," in Proc. 18th Annu. Conf Local Computer Networks, Minneapolis, MN, Sep. 1993, 7 pages.

International Search Report for PCT/US01/08133, Jul. 26, 2001, 3 Pages.

Supplemental European International Search Report for EP 01 91 6650, Feb. 4, 2009, 1 Page.

Marshall K. McKusick, et al. "A Fast File System for UNIX," ACM Transactions on Computer Systems, vol. 2, No. 3, Aug. 3, 1984, 17 pgs.

AR(4) Man Page Retrieved Sep. 2, 2003 From http://docs.sun.com/db/doc/801-6680-01/6i11qc0ml?a=view, 4 pages.

AR(1) Man Page retrieved Sep. 2, 2003 from http://docs.sun/db/doc/801-6680-0116i11qc0ml?=view, 3 Pages.

R. Fielding, et al. "Request for Comments (RFC) 2068", Hypertext Transfer Protocol—HTTP11.1, Jan. 1997, 162 Pages.

Webcam watcher Online Help, Webcam Watcher Version 3.0, Copyright 2001 Beau Software, Date Unknown, 6 Pages.

Appendix E-1 Invalidity Claim Chart over Matsumoto U.S. Pat. No. 6,891,566, Jul. 18, 2013, 8 Pages.

Axis 200+ and 240 Camera Sever User's Guide, Revision 1.0 Dated Jan. 1999, 39 Pages.

Axis 240 Network Camera Server Users Manual, Revision 1.4, Dated Nov. 1998, 129 Pages.

Appendix A-3 Supplemental Invalidity Claim Chart (Supplement to A-1) over Milestone Surveillance Pro Software U.S. Pat. No. 8,185,964, Aug. 5, 2013, 15 Pages.

Appendix A-4 Supplemental Invalidity Claim Chart (Supplement to A-2) over Milestone Surveillance Pro Software U.S. Pat. No. 6,891,566, Aug. 5, 2013, 35 Pages.

Appendix A-6 Invalidity Claim Chart over Suzuki in view of Peinado U.S. Pat. No. 6,891,566, Aug. 5, 2013, 53 Pages.

Appendix A-2 Invalidity Claim Chart over Milestone's Prior Art Software and Secondary References U.S. Pat. No. 6,891,566, Jul. 18, 2013, 15 Pages.

Appendix C-1 Invalidity Claim Chart over Suzuki in view of Simerly U.S. Pat. No. 6,891,566, Jul. 18, 2013, 10 Pages.

Appendix B-2 Supplemental Invalidity Claim Chart (Supplement to B-1) over Suzuki and Kogane U.S. Pat. No. 8,185,964, Aug. 5, 2013, 14 Pages.

Appendix B-3 Supplemental Invalidity Claim Chart over Morita in view of Kogane U.S. Pat. No. 6,891,566, Aug. 5, 2013, 11 Pages.

Appendix C-2 Supplemental Invalidity Claim Chart (Supplement to C-1) over Suzuki in view of Simerly, U.S. Pat. No. 6,891,566, Aug. 5, 2013, 10 Pages.

Appendix C-3 Invalidity Claim Chart over Morita in view of Simerly U.S. Pat. No. 6,891,566, Aug. 5, 2013, 7 Pages.

Appendix D-2 Supplemental Invalidity Claim Chart (Supplement to D-1) over Normura and Secondary References, Aug. 5, 2013, 23 Pages.

Case No. 12-cv-12276-NGE-MJH, Eastern Disctrict of Michigan, "Defendant Milestone Systems, Inc's Second Supplemental Answers and Objections to First set of Interrogatories No. 2 and Supplemetnal Answers and Objections to Nos. 6 Through 10", Aug. 2, 2013, 83 Pages.

Case No. 12-cv-12276-NGE-MJH, Eastern District of Michigan, "Defendant Milestone Systems A/S's Answers and Objections to First Set of Interrogatories Nos. 3 Through 10, and Supplemental Answer to No. 2", Aug. 2, 2013, 83 Pages.

Case No. 12-cv-12276-NGE-MJH, Eastern District of Michigan, "Defendant Milestone Systems, Inc's Supplemental Answers and Objections to first set of interrogatories Nos. 1, 2 and 11", Jul. 17, 2013, 41 Pages.

Case No. 12-cv-12276-NGE-MJH, Eastern District of Michigan, "Defendant Milestone Systems A/S's Answers and Objections to First Set of Interrogatories Nos. 1 and 2", Jul. 17, 2013, 35 Pages.

Appendix B-1 Invalidity Claim Chart over Suzuki and Kogane U.S. Pat. No. 8,185,964, Jul. 18, 2013, 14 Pages.

\* cited by examiner

HTTP Request Example

Scanner requests the following URL http://root:pass@192.168.0.202:80/axis-cgi/admin/getparam.cgi?root.Network.eth0

Device responds with the following data root.Network.eth0.MACAddress=00:40:8C:68:32:04
root.Network.eth0.IPAddress=192.168.0.202
root.Network.eth0.SubnetMask=255.255.255.0
root.Network.eth0.Broadcast=192.168.0.255

Scanner parses for the unique Text eth0.MACAddress root.Network.eth0.MACAddress=00:40:8C:68:32:04
root.Network.eth0.IPAddress=192.168.0.202
root.Network.eth0.SubnetMask=255.255.255.0
root.Network.eth0.Broadcast=192.168.0.255

Data found. Offset is computed to locate the MAC address. Reported to user or application. 00:40:8C:68:32:04

*Fig. 8*

NETWORK DEVICE DETECTION, IDENTIFICATION, AND MANAGEMENT

CROSS-REFERENCE TO RELATED APPLICATION

This application claims the priority of U.S. Provisional Application No. 60/744,307, filed Apr. 5, 2006, the entire contents of which are hereby incorporated by reference.

TECHNICAL FIELD

This invention relates generally to computer networks and, more particularly, to techniques for discovering and configuring networked devices over a computer network.

BACKGROUND OF THE INVENTION

Networked based devices such as IP video cameras, servers and other devices utilize a unique identifier, such as a MAC address which comprises a hardware address permanently stored in the device's memory. This address is a hexadecimal number of 12 digits (IPv4) and possibly more or less digits in future revisions. In the current network environment, the highest order 6 bytes of the MAC address identify the manufacturer, and the low order 6 bytes uniquely distinguishes the device from others by that manufacturer. Some manufacturers may have more than one identifying prefix code, whereas others might own a range of sub-prefix numbers and not the entire prefix itself, in which case more than just the high order 6 bytes are needed to distinguish between manufacturers.

When a device is placed on a network and assigned a network address (e.g., an IP address), the device will respond or otherwise communicate according to one or more protocols enabled by the manufacturer; for example, by http, ftp, or udp request to the proper port. Moreover, manufacturers typically provide one or more methods by which their device can be discovered on the network, and there may be different methods used by different manufacturers or for different types of network devices. These methods include, but are not limited to:
1. The device may broadcast an IP or UDP 'signature' that is monitored by an application loaded on a client computer. This application is provided by the manufacturer for use in accessing and possibly configuring the device. In some instances, this broadcast may occur for a limited period of time; e.g., for ten minutes following boot up after which it stops.
2. The device may have an open port listening for command or data signatures from the manufacturer's application.
3. The manufacturer's application may communicate with the device via http, ftp, Telnet or other protocol to discover the product type.
4. The manufacturer's device may support UPnP (Universal Plug and Play)
5. The device may utilize non standard/proprietary methods for communicating over the network wire, radio or other process.

This list represents a few methods to discover the product. Further complication exists where:
1. The device is restricted by firewalls or other management software/firmware and or switching.
2. The device has an unknown user or admin access login account.
3. The device has an older firmware and does not understand the manufacturer's software functions and signatures/listening ports.
4. The device has been configured to deny normal access.
5. The device is malfunctioning, but still online.

With all the possible permutations, it becomes quite apparent that a network containing multiple vendors' products could be difficult to manage, and this difficulty can be exacerbated in situations involving a large scale network of many devices.

When management is required for a particular device, the IP address is typically referenced to locate the specific device. Once this address is known, a web browser or other software can be used to access and manage the device. Management of such devices can become problematic, especially where the number of networked devices becomes large and/or the network contains a variety of different types of devices (e.g., computers, printers, IP cameras).

Definitions of terms used in this application:

"network address" means a unique network identifier used by a network communication protocol to access a device over a network; for example, an IP address.

"hardware address" means a unique device identifier associated with and stored on a device to distinguish that device from other devices; for example, a MAC address.

"computer readable memory" is any memory device capable of storing computer program code including magnetic media, solid-state memories, optical media (DVD, etc.).

SUMMARY OF THE INVENTION

In accordance with the invention there is provided a system, method, and computer readable memory programmed for identifying devices on a network. The identification of devices is carried out using the steps of scanning the network for devices by sending a request to each of a plurality of network addresses, receiving a response from one or more of the devices, obtaining a hardware address for at least some of the responding devices, and identifying the device based on the hardware address. In one embodiment, the method is used on a TCP/IP network to scan a range of IP addresses, obtain MAC addresses from devices located at addresses within the range, and then determine more specific identifying information for the devices. A user interface can be provided to display the results of the scan along with the more specific identifying information for some or all of the responding devices. In accordance with another aspect of the invention, this scanning and identification process can be used for network device management.

BRIEF DESCRIPTION OF THE DRAWINGS

Preferred exemplary embodiments of the invention will hereinafter be described in conjunction with the appended drawings, wherein like designations denote like elements, and wherein:

FIG. 8 shows a more detailed example of how device information can be obtained using the process of FIG. 7;

DETAILED DESCRIPTION OF THE PREFERRED EMBODIMENTS

Figure 1:
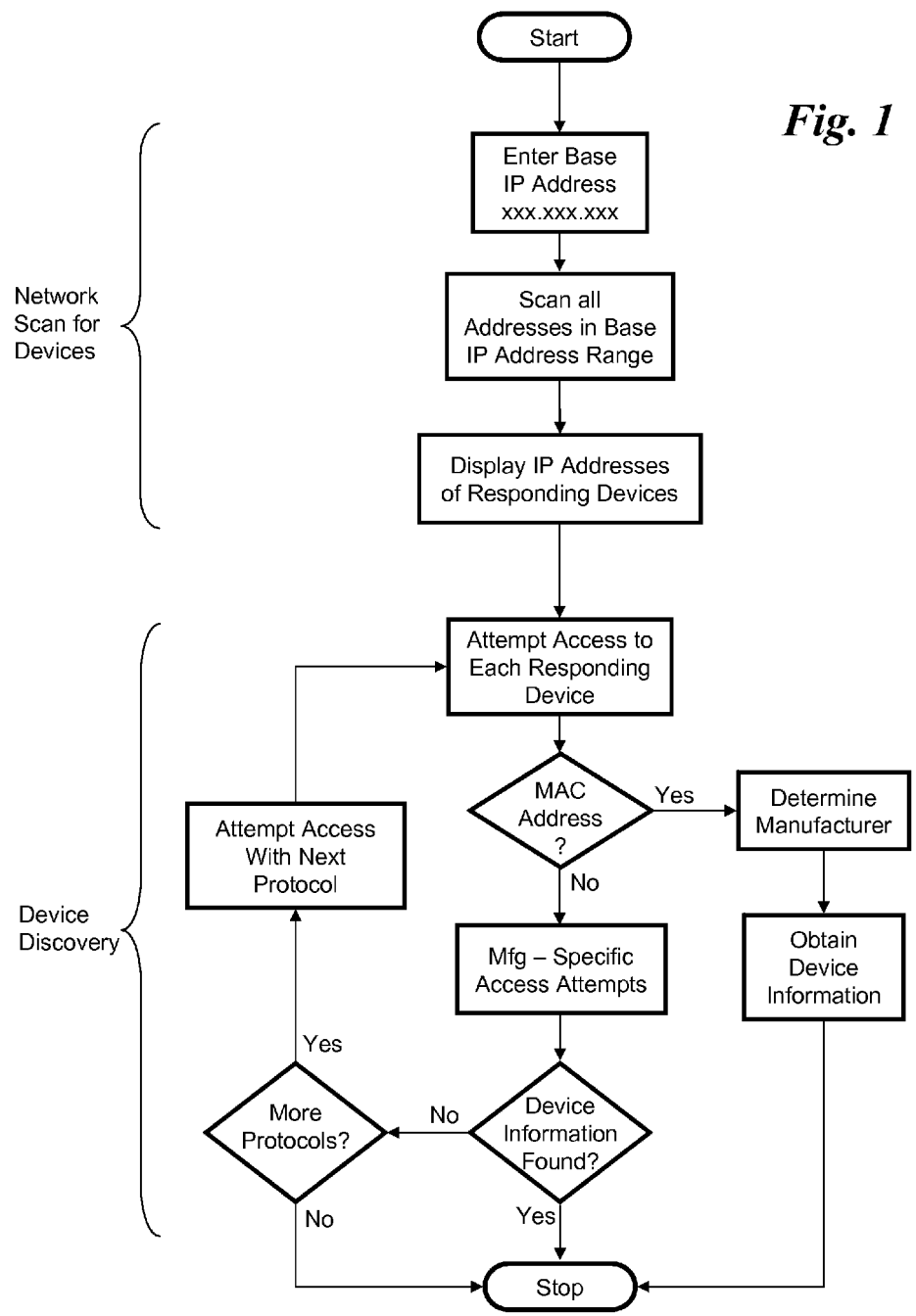
FIG. 1 is a flowchart of a method for identifying devices on a network in accordance with the invention.

Referring to FIG. 1, there is shown an overview of a network device scanner process that can be used to determine which addresses within a range of IP addresses have accessible devices assigned to the IP address and, further, can discover the particular type of device (including manufacturer, make, and model) at each accessible IP address. This process can be implemented in software (e.g., as an applet) stored on a computer-readable medium and executed by a computer connected to the particular network to be scanned. The illustrated embodiment utilizes an Ethernet network running TCP/IP with MAC addresses being used as the primary means to determine device manufacturer and type; however, it will be appreciated by those skilled in the art that the invention can be used in conjunction with other types of networks and communication protocols, and furthermore that device discovery can be carried out in many instances without the use of a MAC address or other unique device identifier. U.S. Pat. No. 6,891,566 B2, issued May 10, 2005, discloses an exemplary suitable Ethernet network running TCI/IP that includes pingable devices uniquely identifiable by MAC addresses, along with a client computer having a computer readable memory on which the software discussed herein can be stored. The entire contents of this U.S. Pat. No. 6,891,566 B2 are hereby incorporated by reference.

Figure 2:
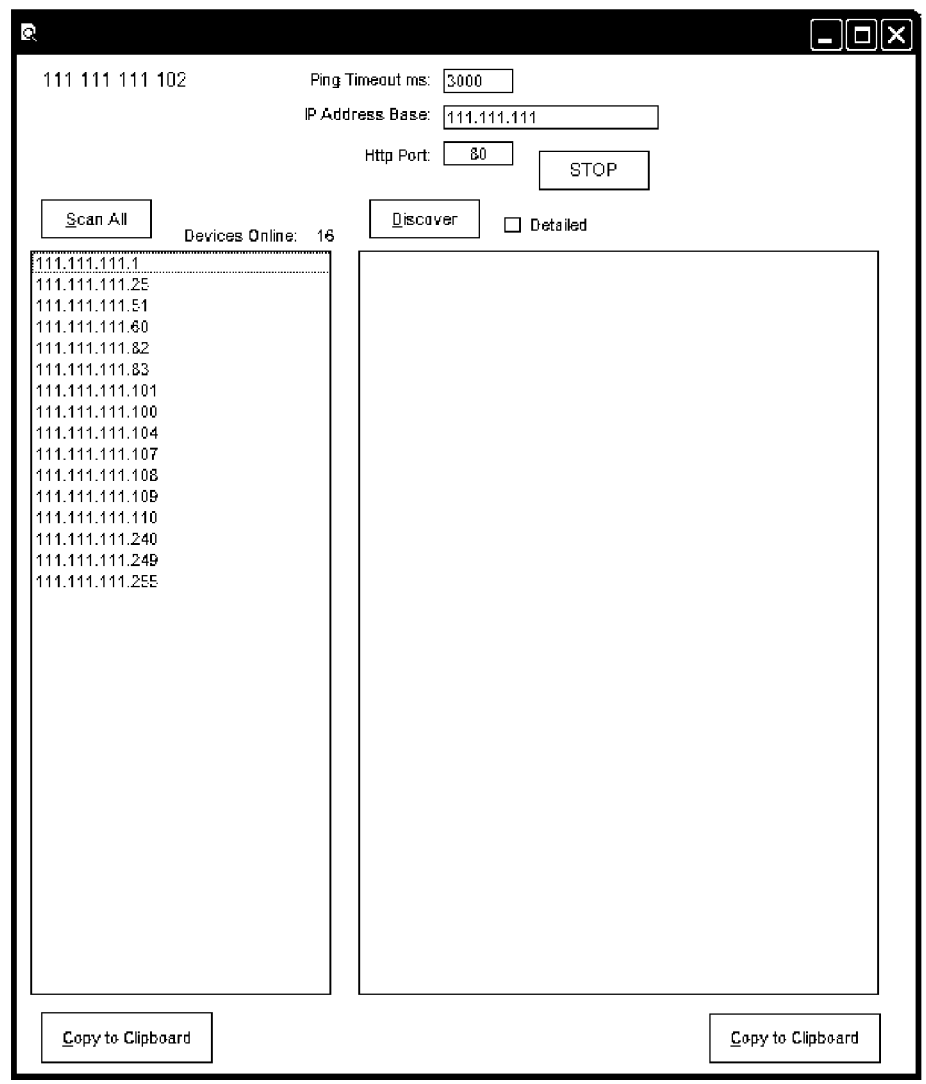
FIGS. 2 and 3 depict an exemplary user interface display of the results of the process of FIG. 1.
Figure 3:
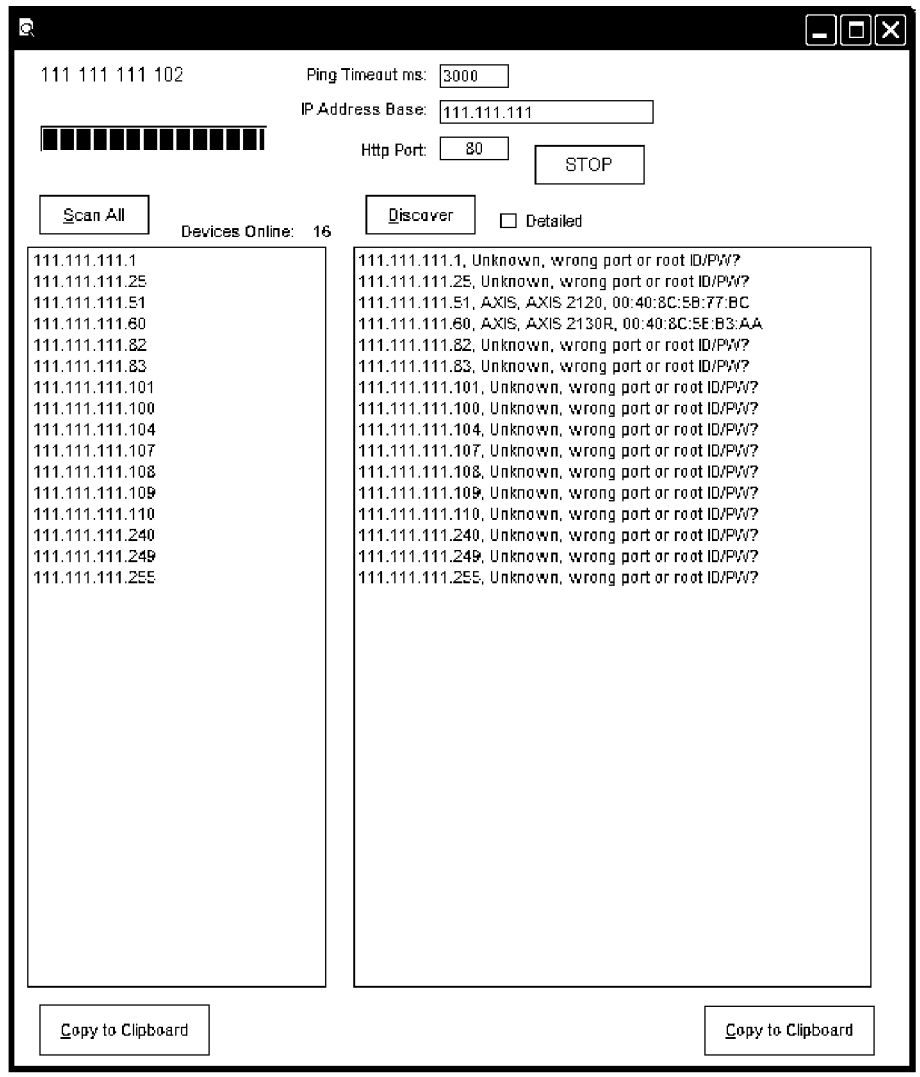

FIGS. 2 and 3 depict an exemplary user interface display for the software that carries out the device scanning process of FIG. 1. The user interface includes an upper region that displays the IP address of the host computer on which the program resides, as well as several user-fillable fields that provide the basic parameters used for network scanning and device access. In particular, there is provided a Ping Timeout field, an IP Address Base field, and an Http Port field. The Ping Timeout field allows the user to specify the amount of time (in milliseconds) that the program will wait to receive a response from a possible device located at an IP address before giving up and assuming that there is no pingable device at that address. The IP Address Base specifies the IP address range to be scanned, so that the user specifies the base address xxx.xxx.xxx and the program will scan from xxx.xxx.xxx.1 through xxx.xxx.xxx.255. The Http Port field allows the user to specify on what port the program will attempt an http request to a particular IP address specified by the user. The user interface also includes two lower side-by-side windows, one on the left to list the scanned IP addresses for which a response was received, and one on the right to provide details about the devices at the various accessible IP addresses in the event the user requests that the devices be discovered.

With reference back to FIG. 1, the overall process for network scanning and device discovery will now be described in conjunction with the screen displays shown in FIGS. 2 and 3. Upon startup of the program, the program detects the IP address of the computer executing the program and displays it in the top left of the user interface as shown. Also, this IP address is used to provide a default value in the IP Address Base field, which the user can then change to a different address range, if desired. The other fields also have default values, as shown. Once the desired IP Address Base is provided in the supplied field, the user clicks on the "Scan All" button, at which point the program scans all of the IP addresses within that base range. Preferably, this is done by pinging the IP addresses and thereafter displaying a list of IP addresses for which a response was received. At this point, the network has now been scanned for pingable devices located within the base IP address range.

Next, the device discovery process can be initiated by the user. This involves clicking on the "Discover" button which causes the program to go through the list of displayed IP addresses and attempt to retrieve further information that can be used to identify the device at each particular IP address. To accomplish this, the program attempts access to each device initially by sending an http request and, if a response is received, the returned information is parsed for a MAC address if not already known. If a MAC address has been obtained, it can be used to determine the manufacturer and this information can then be used to determine that particular manufacturer's scheme for supplying device information. This then enables the program to obtain the device information and the discovery process is then done for that IP address. If, instead, no MAC address was received, then the program initiates a series of manufacturer-specific access attempts using known URL and/or other request formats to obtain the MAC address and/or other specific device information. If the information cannot be obtained in this manner, then the discovery process essentially repeats, this time using another protocol such as ftp, which for some devices can be used to obtain a stored file containing the device information. This loop is repeated one or more times again, if necessary, each time using a different access protocol. If none of these processes result in the desired information being discovered, then the IP address is reported in the right pane along with an "Unknown" message such as is shown in FIG. 3 for IP address 111.111.111.1. If the device information is obtained, then it is provided as shown in FIG. 3 for IP address 111.111.111.51. In this case, the manufacturer, model number, and MAC address is displayed, although more or less information could be included. Also, if the "Detail" check button is selected, then the displayed results can include additional information, such as firmware version number or the administrator-assigned device name, if one exists.

Figure 4:
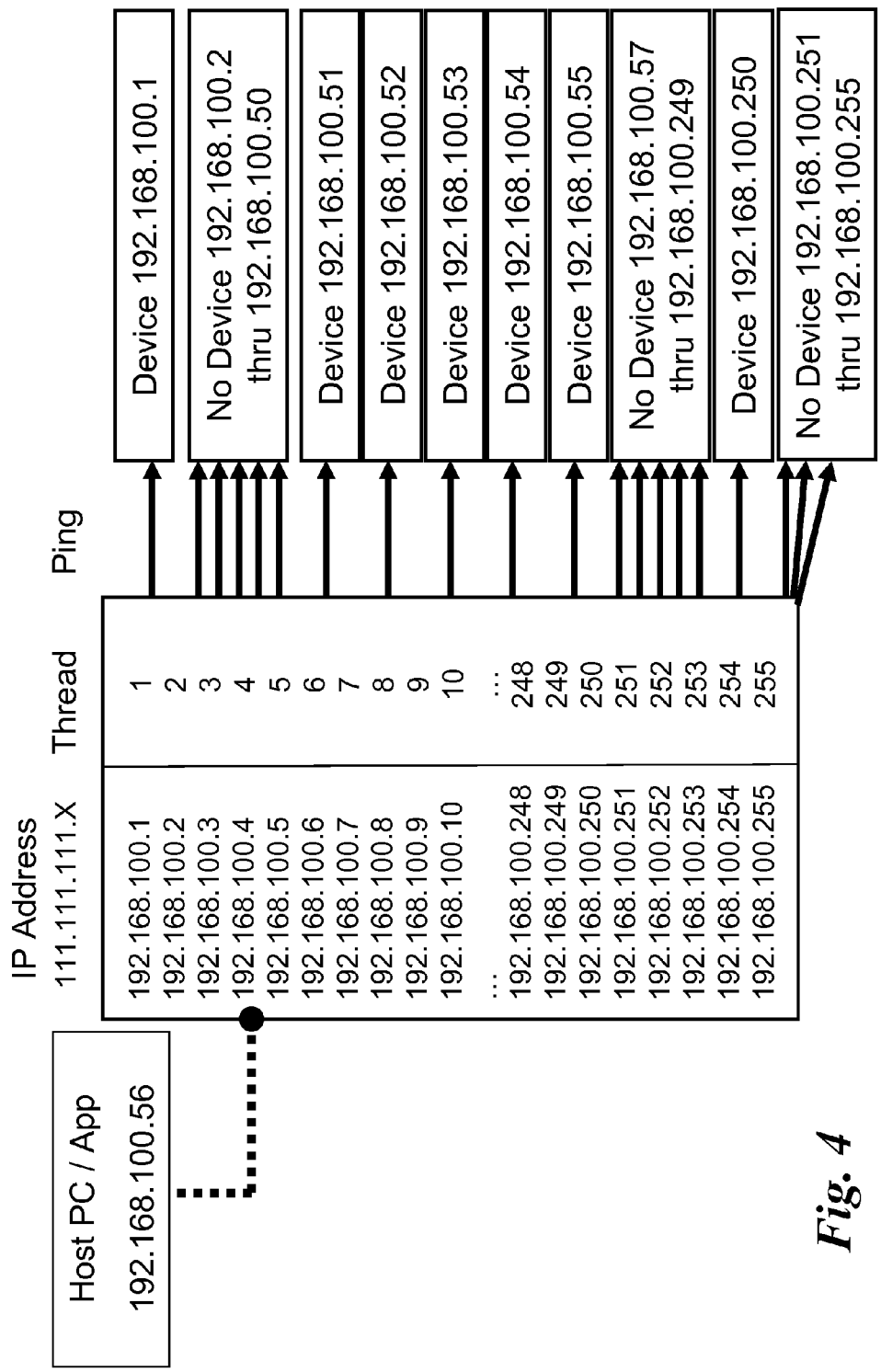
FIG. 4 is a diagram depicting an example of the multi-threaded process and results of the network scan using that process.

The remaining figures and description provide additional detail and features concerning the disclosed embodiment. Turning now to FIG. 4, a multi-threaded process is used to effect the network scan of IP addresses. This involves initiating a separate thread for each IP address and then (nearly) simultaneously pinging all of the IP addresses within the range. By simultaneous it is meant that pinging of addresses is carried out in parallel and not sequentially so that, rather than sending out a ping to one IP address and then waiting for the response or a timeout before pinging the next address, the program instead initiates a thread for each IP address and sends out a separate ping on each thread. This provides a very quick way of scanning the network since the total time to obtain results for all IP addresses in the range is the timeout set in the Ping Timeout field.

Figure 5:
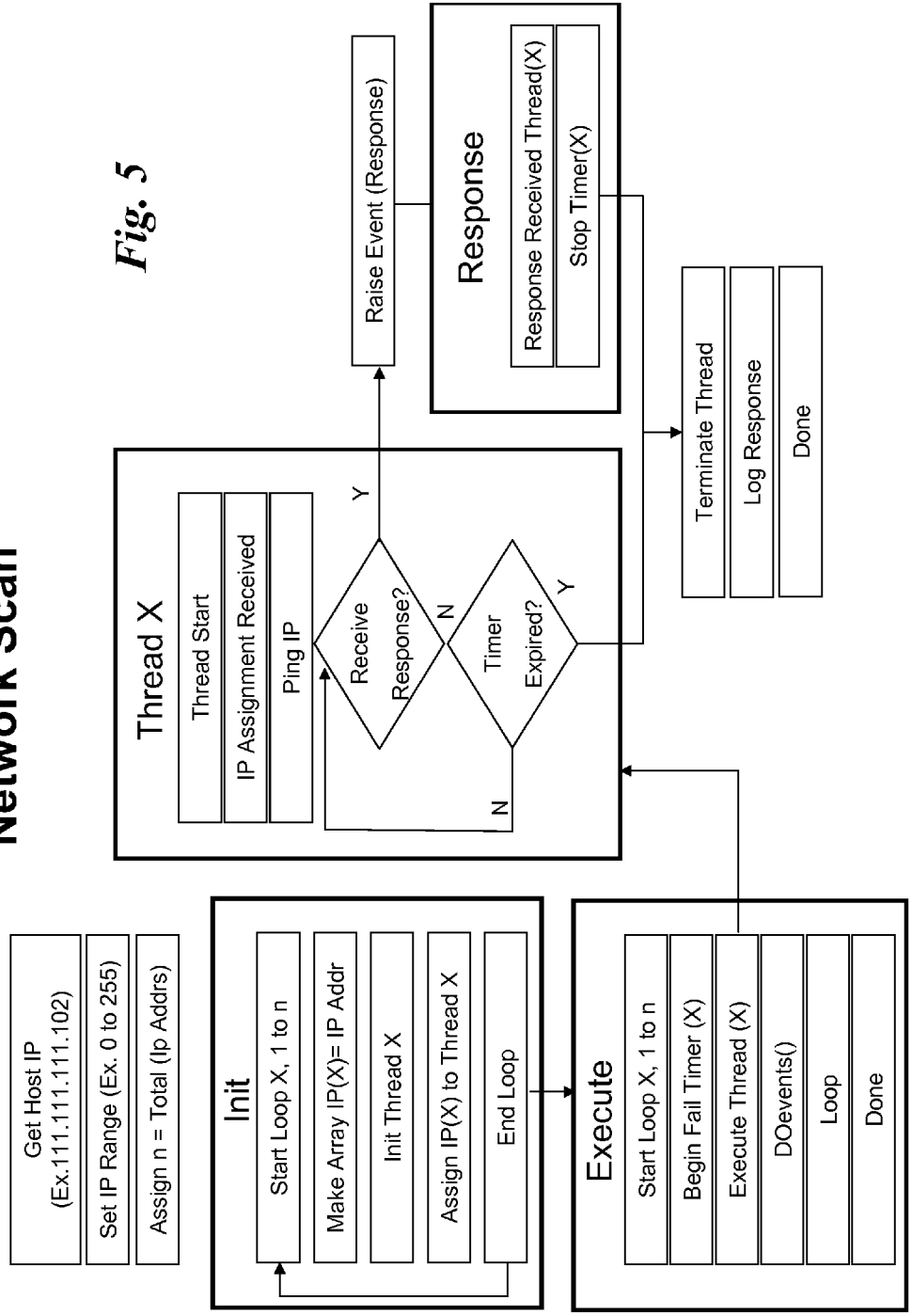
FIG. 5 is a flowchart of the multi-threaded network scanning process used in the method of FIG. 1.

FIG. 5 depicts the network scan process in greater detail. Initially, the program gets the host computer's IP address and displays it on the user interface, as discussed above. Then, it sets the IP search range, which for this embodiment is 0-255 and assigns a variable n equal to the total number of IP addresses in the range (e.g., 256). Next, a thread initiation routine is used to start a thread for each IP address. This involves setting up a loop X that will cycle n times, with each loop including the steps of: (1) creating the next IP address using the IP Address Base specified by the user (e.g., 111.111.111.X), (2) adding it to an array IP(X), (3) initiating a thread X, and (4) assigning the IP address to the thread. Once this is done, the threads are executed as shown in FIG. 5. This involves starting a new loop X=1 to n, beginning a fail timer for that thread, executing the thread, releasing control to allow other processing (e.g., by a DOevents( ) function), and then looping until all threads have been executed. The execution of each thread is shown in FIG. 5 wherein the thread is started, the IP address assigned to that thread is received (pulled from the array IP(X)), and the IP address is pinged. If a response is received, then a RaiseEvent statement is used to initiate the Response processing shown in FIG. 5. If no response is received and the timeout timer has not yet expired, then the process loops back and this continues until either a response is received or the timer expires. Once the timer expires, the thread is terminated and the failure can be logged or just ignored. Where a response is received, the timer is stopped, the thread terminated, and the result logged, which includes displaying the successful IP address in the left hand pane of the user interface. Again, this thread execution and result processing can be carried out concurrently for each of the IP addresses, thereby providing a fast way to scan a network for devices.

As shown in FIG. 2, the example scan returned 16 devices on the network for the selected range of IP addresses. There are actually 17, one of which is the host system running the software above, and is not reported in the list by design. This IP address could be listed in the left pane if the user desired it. To assist the user in discovering information concerning the device at each IP address and/or for web-based configuration of such devices, the program allows the user to double click on any of the IP addresses displayed in the left pane, and the program then launches a browser window (e.g., the computer's default browser such as Microsoft™ Internet Explorer™) and sends an http web page request to that IP address using the port number (e.g., 80) specified in the Http Port field. If the device is a web enabled IP camera, video server or other compatible web based device, a web page will launch in the systems default web browser at the port specified. If the device does not successfully return a page of information, the user could adjust the port number to any other valid port number and refresh the request from the browser or other application. Furthermore, a port loop can be included in the process to test for all ports for a given IP address from 0 to the limits of IPV4 ports (e.g., a search of 111.111.111.33:1 to 111.111.111.33:3200). While this port iteration is more intensive a search, increasing total search time, it is able to find devices more robustly. If desired, the program can be used to launch a different (non-browser) application that seeks to access the device at the IP address, and the program can allow user configuration of the application to be launched as well as of various parameters used by the chosen application. Other type of device queries could be made available in addition to or in lieu of the http request and this can be made available to the user either by clicking on the IP address or by some other user interface means.

Turning now to the remaining figures, further details of the device discovery process of FIG. 1 will now be described. In general, the approach involves scanning the known IP addresses displayed in the left pane, and querying them with multiple protocols and methods. Known signatures (typically based on manufacturer) in the memory and or firmware of the device are scanned and those that are found are reported. Reporting can include, but is not limited to:

1) IP address
2) MAC address
3) Manufacturer Name
4) Manufacturer Model
5) Model Revision
6) Firmware version
7) Other required or desired information These items are collected and reported in the right pane as shown in FIG. 3, with more or less of the information being displayed based on whether or not the Detail checkbox has been marked. This information could also be placed into a file, database, or communicated to another process.

Figure 6:
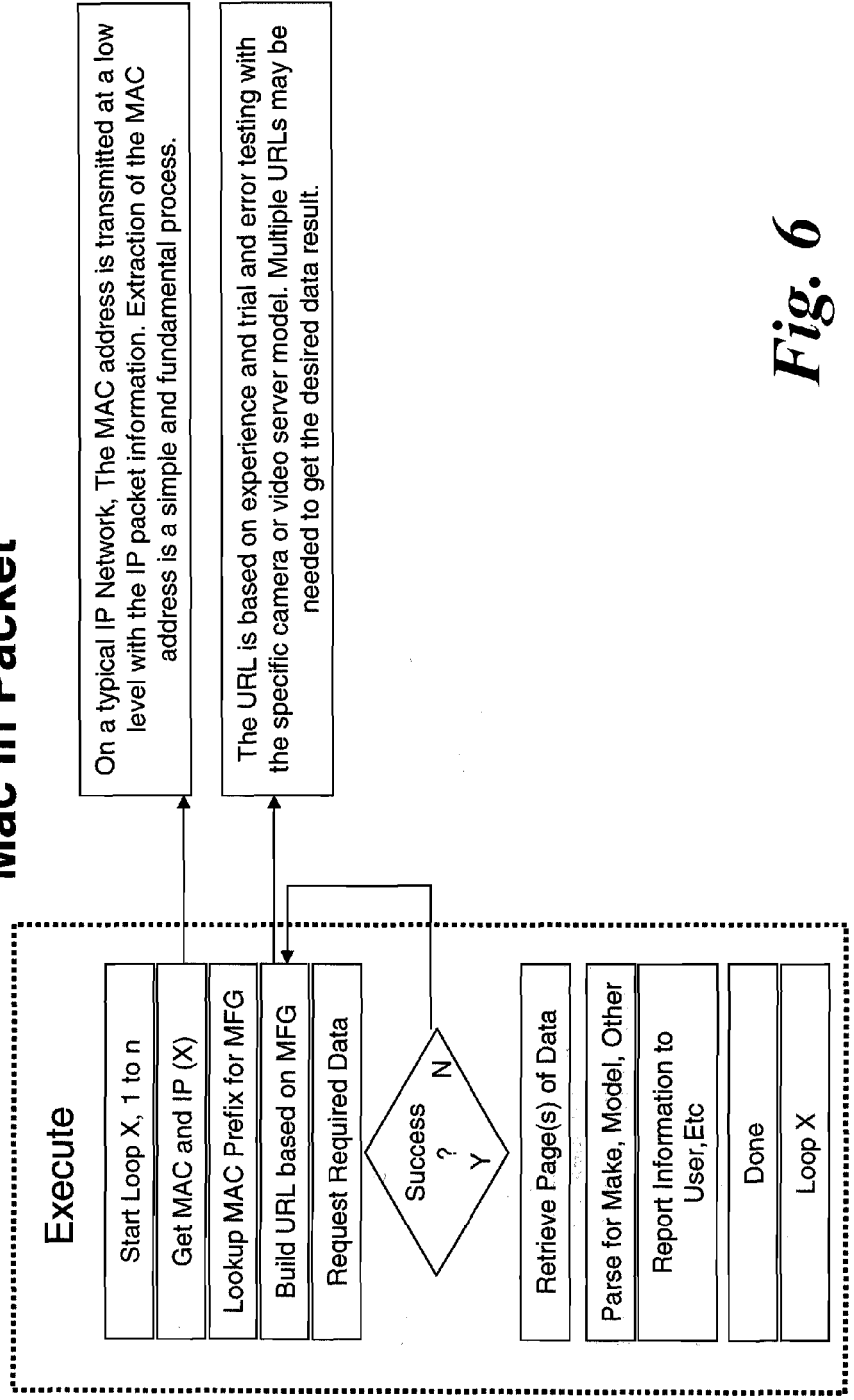
FIG. 6 is a flowchart of a process for identifying a device using http where the MAC address of the device was returned in during the network scan.
Figure 7:
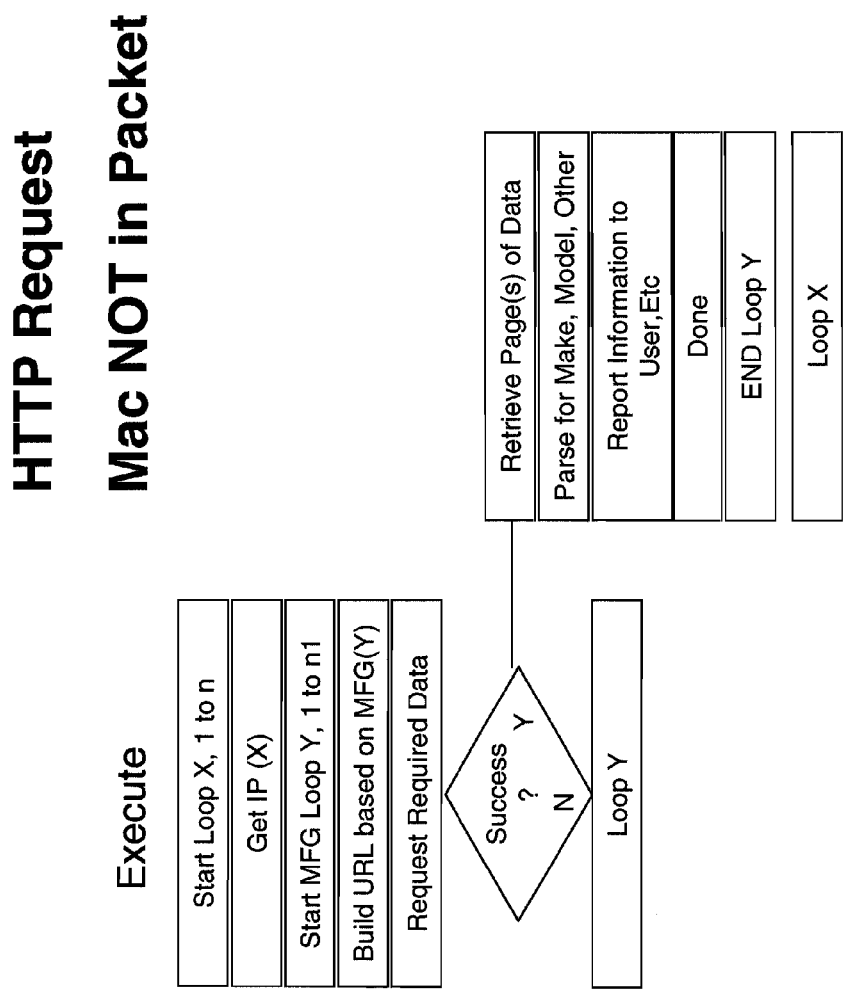
FIG. 7 is a flowchart of a process for identifying a device using http where the MAC address of the device was not returned in during the network scan.

The fundamental approach used by the program for device discovery is to attempt accesses to the device using different protocols and, as necessary for each protocol, attempting accesses using the different known approaches for obtaining device information, many of which are manufacturer specific. The protocols are used in order of probability of success and, for this purpose, the first iterative loop uses an http request, as shown in FIGS. 6 and 7. The processes of these two figures are alternatives based on whether or not the device MAC address has already been obtained. As is known, the MAC address is often transmitted on typical IP networks at a low level with the IP packet information and, thus, the MAC address is often obtained as a result of the network scan ping. If so, then the process of FIG. 6 is used wherein a loop X=1 to n is begun, n being the number of displayed IP addresses in the left pane. First, the MAC address already received is obtained along with the associated IP address. The MAC prefix is used to do a lookup of the manufacturer and, based on this, a URL is built using the syntax and content used by that manufacturer to query the device for information. The URL is then sent as an http request. If not successful, the process loops back to try another URL or other request approach consistent with that manufacturer. Different request formats may be used by the manufacturer for different models, firmware versions, or types of devices. Preferably, these requests are ordered by likelihood of success to minimize the time required to successfully obtain the device information. For example, for a particular manufacturer they can be ordered by popularity of type of device or model number. Once a successful request is made, the information is returned as one or more pages of data which are then parsed for the desired information. Parsing of the received data can be done according to the known content and organization used by the particular manufacturer. Thereafter, the information is reported (displayed in the right pane of the user interface) and/or otherwise processed or stored. This process then repeats for the next IP address. Although not shown, if the iterative process of sending different requests to obtain the data is not successful to the point where the process exhausts its list of possible requests, then the program can break out of this loop and rely on attempts using another protocol to get the desired information.

FIG. 7 depicts the http request process where the MAC address has been stripped from the IP packet information or is otherwise not reported during the network ping scan. This process is similar to that of FIG. 6 except, that since no MAC address is known, the process includes an internal loop Y in which it loops through a comprehensive list of manufacturers and builds URLs based on the different manufacturers and their specific devices and models. Although this process could include a further nested loop as in FIG. 6 to attempt different requests for each manufacturer, instead, in the illustrated process, each of the different URL or other requests for a particular manufacturer are treated as different manufacturers (MFG(Y)).

FIG. 8 shows an example http request according to the process of FIG. 7 in which a URL specific to Axis™ network cameras is sent to the IP address 192.168.0.202. This may be one of hundreds of different URL commands sent as a result of the process of FIG. 7 attempting to obtain a response using different manufacturers' URL requests. In this case, the device responds with the data shown and the program then parses this data to locate the MAC address and possibly other desired information. The location of the MAC address and other information in the returned data can be determined using known information about the structure of the returned information based on product type or manufacturer, etc.

Figure 9:
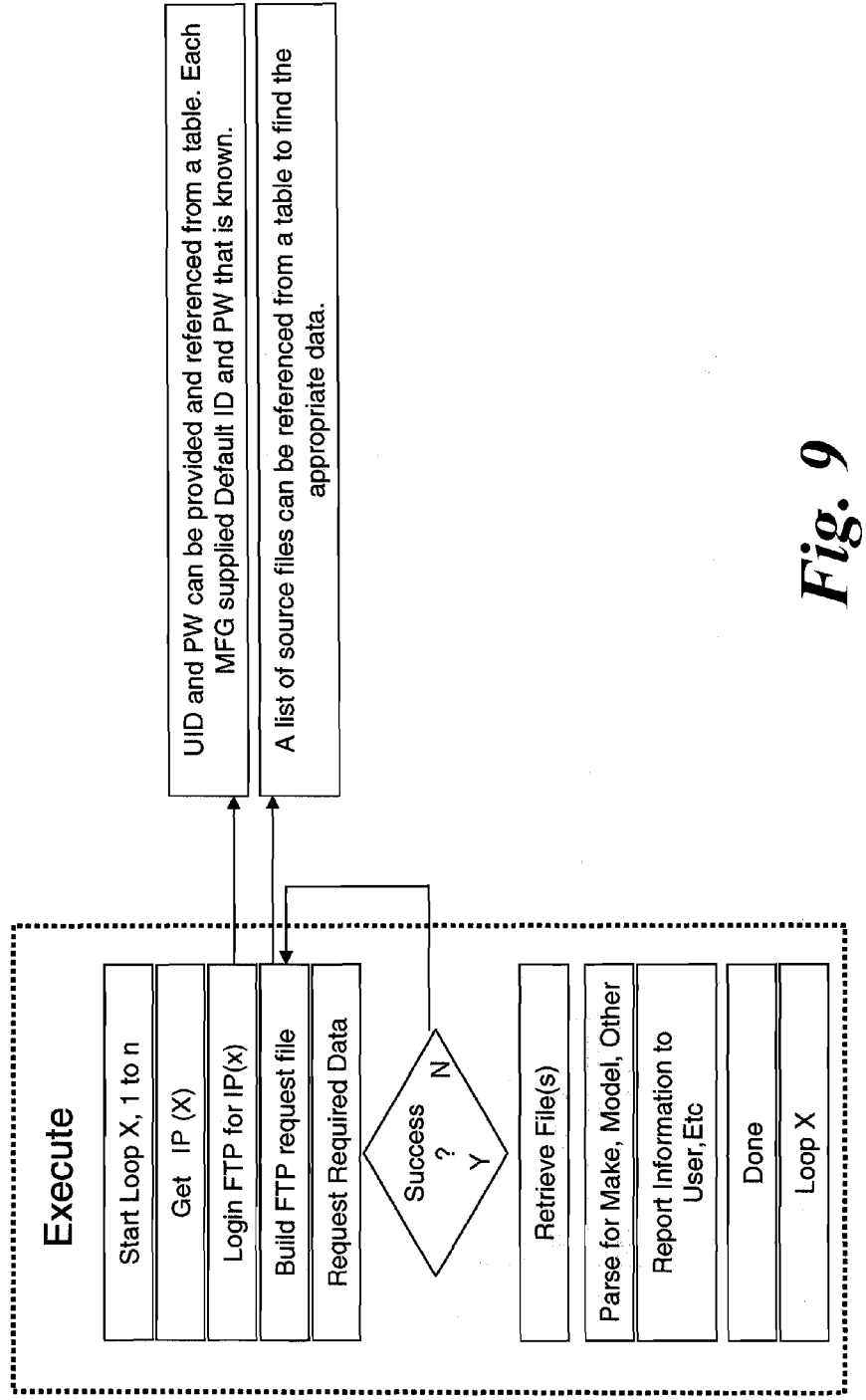
FIG. 9 is a flowchart of a process for identifying a device using ftp.

In the event that the http request approach is not successful, the process of FIG. 1 attempts access to the device at a particular IP address using the next protocol, in this case ftp as shown in FIG. 9. The process is similar to that of FIG. 7, except that the program must attempt to login to the ftp (which can be attempted anonymously or based on known manufacturer-specific default IDs and passwords). Where the login is successful for a particular device, the program then requests the appropriate file containing the device information and, again, this request can be specific to such things as the manufacturer, type of device, and/or model. Once the file is obtained, the relevant information is extracted and displayed in the right pane of the user interface.

Figure 10:
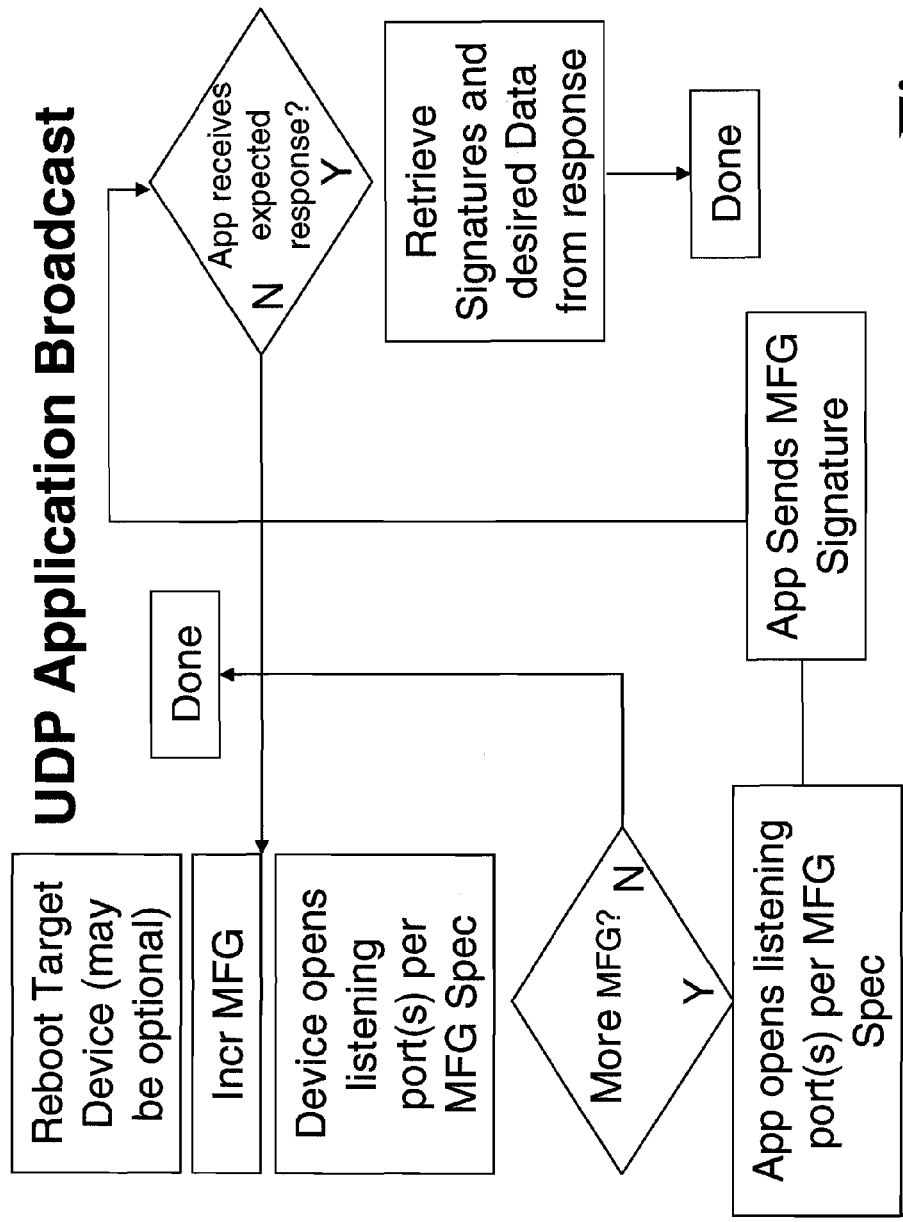
FIG. 10 is a flowchart of a first process for identifying a device using udp.
Figure 11:
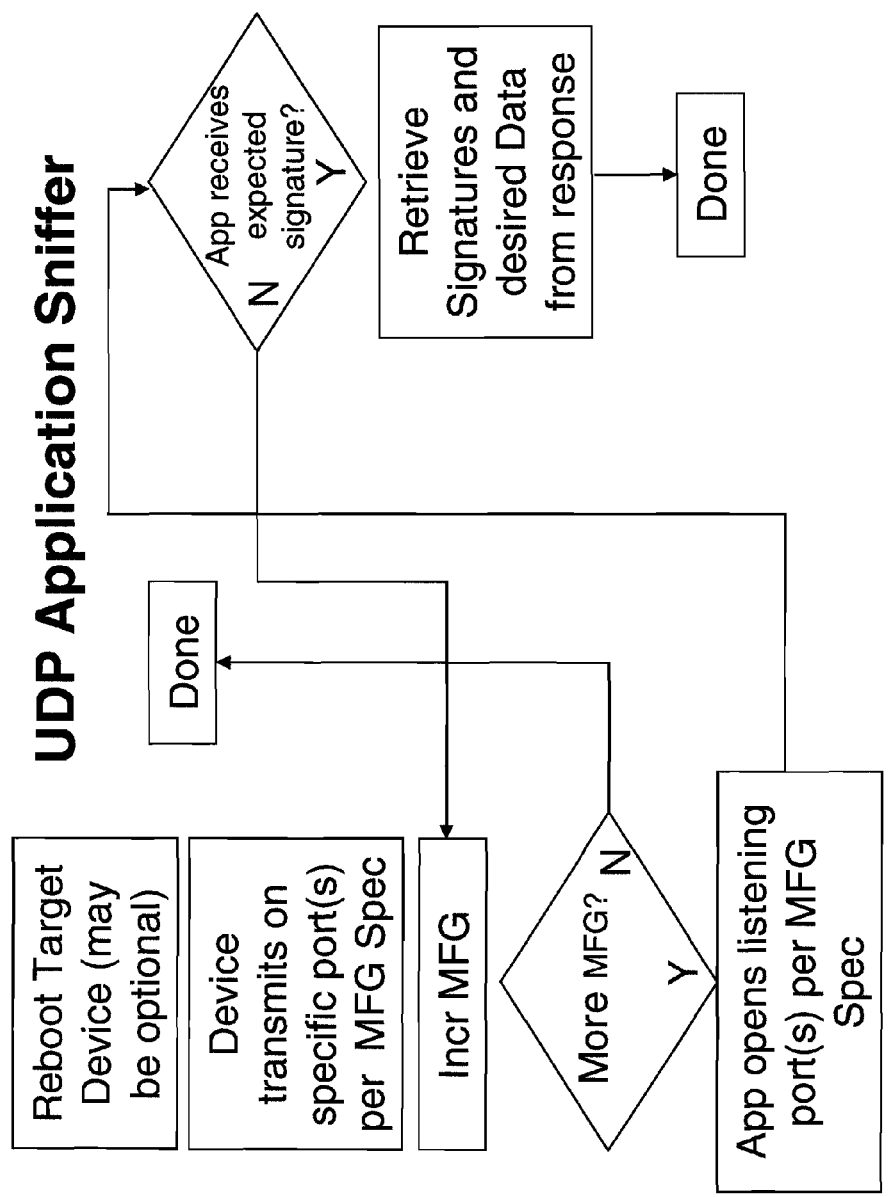
FIG. 11 is a flowchart of a second process for identifying a device using udp.

FIGS. 10 and 11 provide further protocol examples which can be used in the event that both the http and ftp approaches fail. Since some devices utilize UDP differently, the program can try different UDP approaches; for example, the UDP broadcast of FIG. 10 wherein the device opens a listening port and then listens for the proper manufacturer-specific signature to be sent from the application program. Alternatively, in FIG. 11, a UDP application sniffer can be used in which the application program itself opens a listening port and listens for the device to transmit over that port per the manufacturer's specification. In either event, if the expected response (signature) is received, then the program extracts the desired data and displays it.

Figure 12:
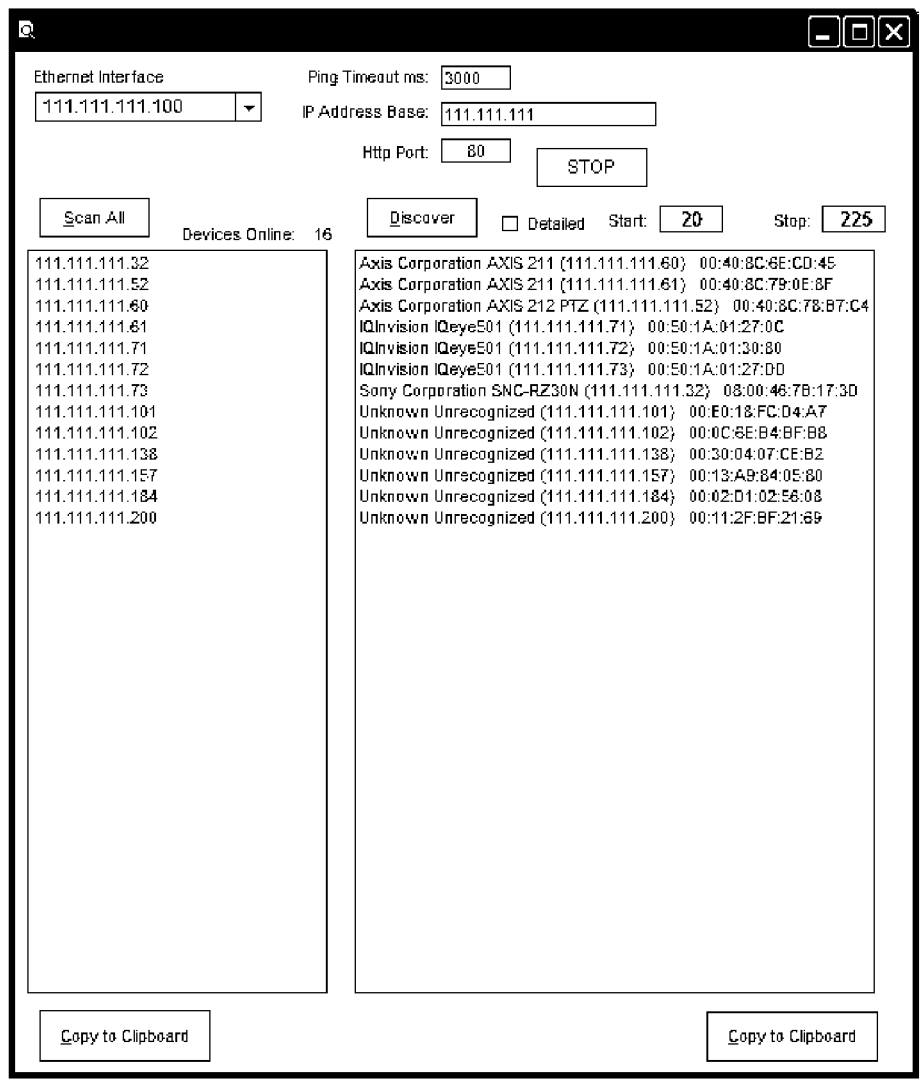
FIG. 12 depicts an alternative embodiment of the user interface shown in FIGS. 2 and 3.

FIG. 12 depicts another embodiment of the user interface shown in FIGS. 2 and 3. This embodiment differs primarily in that it includes a configurable range control for the IP addresses scanned. In the example show, a start value of 20 and stop value of 225 has been included such that the scan will be limited to 111.111.111.20 through 111.111.111.225. It will be appreciated by those skilled in the art that the illustrated embodiments are directed to a typical TCP/IP environment in which addresses are limited to 0-255; however, the scanning process can be used to cover addresses beyond that range. Furthermore, the IP base address need not be limited to xxx.xxx.xxx, but any range of addresses can be scanned, e.g., by specifying only xxx.xxx or xxx.xx in the IP Address Base field. Also, the process can be designed to allow exclusions of regions for which scanning is not desired or may be problematic. Another difference of the FIG. 12 user interface embodiment from that of FIG. 3 is that the returned listing of devices can be sorted alphanumerically as shown in FIG. 12, rather than in order of their IP address.

The device discovery process has been described as being implemented using loops that sequentially attempt accesses based on such things as protocols (outer loop) and manufacturer and device type (inner loop). However, as an alternative implementation, it would be advantageous to test all permutations of device signatures simultaneously as is done for the initial network scan discussed above in connection with FIG. 4, since web based devices allow for multiple sessions of connections concurrently. This can include providing multiple simultaneous requests using different protocols and/or different request formats. For this approach, the device discovery process will immediately terminate other methods and processes attempting to do the same. Whichever approach is used (sequential or simultaneous requests), one approach for querying the devices in an optimized order is by the following methodology:
1) Most popular Manufacturer
2) Most popular methodology based on #1
3) 'Other' methods allowed by the manufacturer or protocol used.
4) Other utilities result sets yielding device and or network information The manufacturer and device specific information can be hardcoded into the program or can be supplied as one or more separate script libraries. Each manufacturer can have its own script library specifying the particular URL, ftp, UDP, and other request syntax that is specific to that manufacturer, as well as the information needed to extract the desired data out of the response received from the device. Alternatively, the script libraries can be set up by device type so that the program can be used to detect only a specific type of device or even device model. The program would then only use the script library or libraries associated with the desired device type when doing the device discovery. Where the manufacturer or device type information is not organized into separate groups (scripts), then discovery of only certain types of devices can be carried out by discovering all devices and then filtering out for the desired type(s) only.

Apart from network scanning and device discovery, the program can further be used for network management. For example, the program can be used to create a database of devices and settings so that a network administrator can then more easily determine and manage such things as firmware versions. Also, the program can be configured to poll the devices periodically to confirm that they are present and, if desired, that they are working properly. This can be accomplished by performing an initial scan and discovery in which the devices and their configuration is obtained and stored. Thereafter, when the scan is run again, the reported information can be compared with the stored configuration information to determine if anything has changed. Where port scanning is used for one or more IP addresses, found devices discovered via particular ports can be stored with their port numbers making successive scans for these devices and ports more targeted so that, for example, only those ports previously used at an IP address can be subsequently scanned. For such things as network cameras, pinging of the camera might result in a response even if the camera is not functioning properly and able to stream images. Thus, the program can further be configured to request an image or stream to verify that the camera is operating properly. Other advantages of the device reporting provided by the program are:
1) Firmware revisions can be easily reported, scanned for obsolescence and updated where necessary
2) Inventories of devices can be updated in seconds
3) Catastrophic failures can be identified in seconds.
4) Rogue devices can be located, identified and managed.
5) Other value added information can be extracted and or managed.

Device management using the processes described above can also include security monitoring where such devices are present on the network. The devices can be monitored in real time and some devices permit polling or monitoring for counts, triggers, and other events, or for unauthorized access or use.

Another optional feature that can be useful is, for example, to perform a reverse DNS lookup of the IP addresses for which a response is received and then log and/or display the associated domain name. Also, the program can include a library of icons representing the different types of devices and these icons can be included in the display of discovered devices to provide an improved user interface. This could also be used to enable the user to reorder the devices by type.

It is to be understood that the foregoing description is of one or more preferred exemplary embodiments of the invention. The invention is not limited to the particular embodiment(s) disclosed herein. Furthermore, the statements contained in the foregoing description relate to particular embodiments and are not to be construed as limitations on the scope of the invention or on the definition of terms, except where a term or phrase is expressly defined above. Various other embodiments and various changes and modifications to the disclosed embodiment(s) will become apparent to those skilled in the art. For example, although the network scan process described above uses pinging to detect devices, and thus will not detect devices that do not allow ping, if desired, these devices can still be detected by including additional steps that will be known to those skilled in the art. All such other embodiments, changes, and modifications are intended to come within the scope of the invention.

As used herein, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of collecting and using device information from one or more of a number of camera devices on a network, comprising the steps of:
    sending a request for each of a plurality of network addresses;
    receiving a response from one or more of the number of camera devices, wherein each responding camera device is accessible at a specific one of the network addresses;
    establishing communicative interaction with the one or more responding camera devices;
    after establishing the communicative interaction, carrying out the following steps:
    obtaining a hardware address for one or more of the responding camera devices; and
    for at least one of the one or more responding, hardware addressed camera devices, carrying out the following steps:
    determining a manufacturer-specific request for manufacturer-specific device information using the hardware address;
    sending the manufacturer-specific request to the camera device;
    receiving the manufacturer-specific device information from the camera device; and
    using the manufacturer-specific device information to access image data from the camera device.

2. The method of claim 1, wherein the first sending step further comprises sending the requests in parallel for each of the plurality of network addresses without waiting for a response from one or more of the number of camera devices or a request timeout.

3. The method of claim 2, wherein the step of sending the requests in parallel further comprises a multi-threaded process that involves initiating a separate thread for each of the plurality of network addresses and executing the threads concurrently.

4. The method of claim 3, wherein the network utilizes TCP/IP and wherein the execution of each of said threads further comprises pinging an assigned network address and waiting a predetermined amount of time for a response.

5. The method of claim 1, wherein the obtaining step comprises retrieving the hardware address from the response received from at least one of the one or more responding camera devices.

6. The method of claim 1, wherein the obtaining step comprises obtaining a MAC address, and wherein the determining step comprises determining the manufacturer-specific request based on a prefix of the MAC address.

7. The method of claim 6, wherein the obtaining step further comprises obtaining the MAC address from a subsequent request sent after carrying out the step of receiving a response.

8. The method of claim 1, wherein the network utilizes TCP/IP and the receiving step further comprises receiving at least one packet of information from a particular one of the responding devices, and wherein the obtaining step further comprises determining whether the packet includes a MAC address and if so, retrieving the MAC address from the packet.

9. The method of claim 8, wherein, if the packet includes the MAC address, then for the particular one of the responding devices the step of determining a manufacturer-specific request further comprises determining the manufacturer-specific request using the MAC address.

10. The method of claim 8, wherein, if the packet does not include the MAC address, then for the particular one of the responding camera devices the method further comprises sending to the camera device, for each of a plurality of different manufacturers, one or more requests using a format supported by that manufacturer for at least some of its camera devices.

11. The method of claim 1, further comprising the step of generating a user interface that displays the network addresses of the responding camera devices along with manufacturer-specific device information for one or more of the responding camera devices.

12. The method of claim 11, further comprising the step of providing web-based configuration of a particular one of the responding camera devices identified on the user interface, wherein the web-based configuration is provided by launching a separate window in response to selection of particular camera device via the user interface.

13. A method of collecting and using device information from one or more of a number of camera devices on a network, comprising the steps of:
    sending a request for each of a plurality of network addresses;
    receiving a response from one or more of the number of camera devices, wherein each responding camera device is accessible at a specific one of the network addresses;
    establishing communicative interaction with the one or more responding camera devices;
    after establishing the communicative interaction, carrying out the following steps:
    determining a manufacturer-specific request for device information;

sending the manufacturer-specific request to one or more of the responding camera devices over the network;

receiving the device information in response to the manufacturer-specific request over the network; and using the manufacturer-specific device information to access image data from the camera device.

14. The method of claim 13, further comprising the steps of, for one or more of the responding camera devices:

attempting to obtain a hardware address for the camera device;

if a hardware address is obtained for the camera device, then the determining step further comprises determining the manufacturer-specific request based on the hardware address; and if no hardware address is obtained for the camera device, then attempting to obtain the device information using a series of different manufacturer-specific requests sent to the camera device until either the device information is received or all of the manufacturer-specific requests have been sent.

15. The method of claim 14, wherein the step of attempting to obtain the device information further comprises attempting to obtain the device information using the series of different manufacturer-specific requests that are transmitted using a first protocol and, if the device information is not received, then iteratively repeating the attempt one or more times using different protocols.

16. The method of claim 15, wherein the first protocol is http.

17. The method of claim 13, wherein, for each of at least some of the responding camera devices, the determining and subsequent sending step together comprise the step of sending a series of different manufacturer-specific requests to the camera device until either the device information is received or all of the manufacturer-specific requests have been sent.

18. The method of claim 1, wherein the manufacturer-specific request is in the form of an http request.

19. The method of claim 1, wherein the manufacturer-specific device information is a MAC address, a manufacturer name, a manufacturer model, a model revision, or a firmware version.

20. A method of facilitating use of one or more of a number of camera devices on a network, comprising the steps of:

sending a request for each of a plurality of network addresses;

receiving a response from one or more of the number of camera devices, wherein each responding camera device is accessible at a specific one of the network addresses;

establishing communicative interaction with the one or more responding camera devices;

after establishing the communicative interaction, carrying out the following steps:

obtaining a hardware address for one or more of the responding camera devices; and for at least one of the one or more responding, hardware addressed camera devices, carrying out the following steps:

determining a manufacturer-specific request for device information using the hardware address;

sending the manufacturer-specific request to the camera device over the network; and receiving the device information from the camera device over the network to access image data from the camera device.

21. The method of claim 1, wherein the one or more of a number of camera devices includes one or more of a camera connected to a video server and a camera having an integrated video server.

22. The method of claim 1, wherein the image data from the camera device includes one or more of an image or an image stream.

23. A computer system for collecting and using device information from one or more of a number of camera devices on a network, comprising a computer having non-transitory memory for storing machine instructions that are to be executed by the computer, the machine instructions when executed by the computer implement the following functions:

sending a request for each of a plurality of network addresses;

receiving a response from one or more of the number of camera devices, wherein each responding device is accessible at a specific one of the network addresses;

establishing communicative interaction with the one or more responding camera devices;

after establishing the communicative interaction, carrying out the following steps:

obtaining a hardware address for one or more of the responding camera devices; and for at least one of the one or more responding, hardware addressed camera devices, carrying out the following steps:

determining a manufacturer-specific request for manufacturer-specific device information using the hardware address;

sending the manufacturer-specific request to the camera device;

receiving the manufacturer-specific device information from the camera device; and using the manufacturer-specific device information to access image data from the camera device.

24. The computer system of claim 23, wherein the first sending function further comprises sending the requests in parallel for each of the plurality of network addresses without waiting for a response from one or more of the number of camera devices or a request timeout.

25. The computer system of claim 24, wherein the function of sending the requests in parallel further comprises a multi-threaded process that involves initiating a separate thread for each of the plurality of network addresses and executing the threads concurrently.

26. The computer system of claim 25, wherein the network utilizes TCP/IP and wherein the execution of each of said threads further comprises pinging an assigned network address and waiting a predetermined amount of time for a response.

27. The computer system of claim 23, wherein the obtaining step comprises retrieving the hardware address from the response received from at least one of the one or more responding camera devices.

28. The computer system of claim 23, wherein the obtaining step comprises obtaining a MAC address, and wherein the determining step comprises determining the manufacturer-specific request based on a prefix of the MAC address.

29. The computer system of claim 28, wherein the obtaining step further comprises obtaining the MAC address from a subsequent request sent after carrying out the function of receiving a response.

30. The computer system of claim 23, wherein the network utilizes TCP/IP and the receiving function further comprises receiving at least one packet of information from a particular one of the responding devices, and wherein the obtaining step further comprises determining whether the packet includes a MAC address and if so, retrieving the MAC address from the packet.

31. The computer system of claim 30, wherein, if the packet includes the MAC address, then for the particular one of the responding devices the step of determining a manufacturer-specific request further comprises determining the manufacturer-specific request using the MAC address.

32. The computer system of claim 30, wherein, if the packet does not include the MAC address, then for the particular one of the responding camera devices the method further comprises sending to the camera device, for each of a plurality of different manufacturers, one or more requests using a format supported by that manufacturer for at least some of its camera devices.

33. The computer system of claim 23, further comprising the function of generating a user interface that displays the network addresses of the responding camera devices along with manufacturer-specific device information for one or more of the responding camera devices.

34. The computer system of claim 33, further comprising the function of providing web-based configuration of a particular one of the responding camera devices identified on the user interface, wherein the web-based configuration is provided by launching a separate window in response to selection of particular camera device via the user interface.

35. A computer system for collecting and using device information from one or more of a number of camera devices on a network, comprising a computer having non-transitory memory for storing machine instructions that are to be executed by the computer, the machine instructions when executed by the computer implement the following functions:
   sending a request for each of a plurality of network addresses;
   receiving a response from one or more of the number of camera devices, wherein each responding camera device is accessible at a specific one of the network addresses;
   establishing communicative interaction with the one or more responding camera devices;
   after establishing the communicative interaction, carrying out the following steps:
   determining a manufacturer-specific request for device information;
   sending the manufacturer-specific request to one or more of the responding camera devices over the network;
   receiving the device information in response to the manufacturer-specific request over the network; and
   using the manufacturer-specific device information to access image data from the camera device.

36. The computer system of claim 35, further comprising the functions of, for one or more of the responding camera devices:
   attempting to obtain a hardware address for the camera device;
   if a hardware address is obtained for the camera device, then the determining step further comprises determining the manufacturer-specific request based on the hardware address; and
   if no hardware address is obtained for the camera device, then attempting to obtain the device information using a series of different manufacturer-specific requests sent to the camera device until either the device information is received or all of the manufacturer-specific requests have been sent.

37. The computer system of claim 36, wherein the function of attempting to obtain the device information further comprises attempting to obtain the device information using the series of different manufacturer-specific requests that are transmitted using a first protocol and, if the device information is not received, then iteratively repeating the attempt one or more times using different protocols.

38. The computer system of claim 37, wherein the first protocol is http.

39. The computer system of claim 35, wherein, for each of at least some of the responding camera devices, the determining and subsequent sending step together comprise the step of sending a series of different manufacturer-specific requests to the camera device until either the device information is received or all of the manufacturer-specific requests have been sent.

40. The computer system of claim 35, wherein the manufacturer-specific request is in the form of an http request.

41. The computer system of claim 35, wherein the manufacturer-specific device information is a MAC address, a manufacturer name, a manufacturer model, a model revision, or a firmware version.

42. A computer system for facilitating use of one or more of a number of camera devices on a network, comprising a computer having non-transitory memory for storing machine instructions that are to be executed by the computer, the machine instructions when executed by the computer implement the following functions:
   sending a request for each of a plurality of network addresses;
   receiving a response from one or more of the number of camera devices, wherein each responding camera device is accessible at a specific one of the network addresses;
   establishing communicative interaction with the one or more responding camera devices;
   after establishing the communicative interaction, carrying out the following steps:
   obtaining a hardware address for one or more of the responding camera devices; and
   for at least one of the one or more responding, hardware addressed camera devices, carrying out the following steps:
   determining a manufacturer-specific request for device information using the hardware address;
   sending the manufacturer-specific request to the camera device over the network; and
   receiving the device information from the camera device over the network to access image data from the camera device.

* * * * *